(12) United States Patent
Orikasa

(10) Patent No.: US 8,861,000 B2
(45) Date of Patent: Oct. 14, 2014

(54) IMAGE FORMING DEVICE AND IMAGE FORMING SYSTEM FOR ERASING IMAGE DATA

(71) Applicant: Riso Kagaku Corporation, Tokyo (JP)

(72) Inventor: Daisuke Orikasa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 80 days.

(21) Appl. No.: 13/669,000

(22) Filed: Nov. 5, 2012

(65) Prior Publication Data

US 2013/0120793 A1   May 16, 2013

(30) Foreign Application Priority Data

Nov. 11, 2011   (JP) ................................. 2011-247355

(51) Int. Cl.
  *G06F 3/12*   (2006.01)
  *G06F 21/60*   (2013.01)
  *G06F 21/00*   (2013.01)

(52) U.S. Cl.
  CPC ............ *G06F 3/1204* (2013.01); *G06F 21/608* (2013.01); *G06F 2221/2143* (2013.01); *G06F 3/1274* (2013.01); *G06F 21/00* (2013.01); *G06F 2221/0737* (2013.01); *G06F 3/1222* (2013.01); *G06F 3/1279* (2013.01)
  USPC .......................... 358/1.15; 358/3.28; 358/1.16

(58) Field of Classification Search
  CPC ....... G06F 3/12; G06F 3/1202; G06F 3/1203; G06F 3/1218; G06F 3/122; G06F 3/1222; G06F 3/1229; G06F 3/1237; G06F 3/1238; G06F 3/1274; H04N 1/00838; H04N 1/00856; H04N 1/00867; H04N 1/0087; H04N 1/00872; H04N 1/32101; H04N 1/32128; H04N 1/32133
  USPC .............. 358/1.1, 1.15, 3.28, 1.16, 1.18, 401, 358/403, 442, 444
  See application file for complete search history.

(56) References Cited

U.S. PATENT DOCUMENTS

| | | | |
|---|---|---|---|
| 7,327,484 B2 * | 2/2008 | Yamashita et al. | 358/1.15 |
| 7,710,591 B2 * | 5/2010 | Kinoshita | 358/1.16 |
| 8,018,617 B2 * | 9/2011 | Kortenoeven et al. | 358/1.16 |

FOREIGN PATENT DOCUMENTS

JP   2009-140409 A   6/2009

* cited by examiner

*Primary Examiner* — Thomas D Lee
(74) *Attorney, Agent, or Firm* — Nath, Goldberg & Meyer; Jerald L. Meyer

(57) ABSTRACT

An image forming device includes a non-volatile print job storage unit configured to store a print job received from an outside of the image forming device, a non-volatile mapping table storage unit configured to store a mapping table associating a watermark with an overwrite erase pattern predetermined depending on confidentiality indicated by the watermark, a judgment unit configured to judge whether or not the watermark is included in the print job, an extractor configured to extract the overwrite erase pattern corresponding to the watermark included in the print job from the mapping table upon judgment by the judgment unit that the watermark is included, and an erase unit configured to perform an overwrite erase process on the print job stored in the print job storage unit on the basis of the overwrite erase pattern extracted by the extractor.

2 Claims, 3 Drawing Sheets

| WATERMARK | OVERWRITE ERASE PATTERN |
|---|---|
| NOT ASSIGNED | NOT PERFORMED |
| CONFIDENTIAL | 0x00 |
| COMPANY SECRET | 0x00 |
| CLASSIFIED | 0x00⇒0xFF⇒RANDOM NUMBERS |
| HIGHLY CLASSIFIED | 0x00⇒0xFF⇒RANDOM NUMBERS |

IMAGE FORMING DEVICE AND IMAGE FORMING SYSTEM FOR ERASING IMAGE DATA

CROSS REFERENCE TO RELATED APPLICATION

This application is based upon and claims the benefit of priority from the prior Japanese Patent Application No. 2011-247355, filed on Nov. 11, 2011, the entire contents of which are incorporated herein by reference.

BACKGROUND

1. Technical Field

This disclosure relates to an image forming device and an image forming system configured to erase a print job stored in a non-volatile storage medium depending on its security level.

2. Related Art

There is an image forming device configured in a way that when a print job including print setting information, including various printing conditions set on the basis of a user's manipulation, is transmitted to the image forming device from a terminal connected to the image forming device through a network, the print job is stored in a built-in storage unit and printing is performed on the basis of the print job stored in the storage unit.

Japanese Patent Application Publication No. 2009-140409 has proposed a confidential document job controller. This confidential document job controller includes a HDD (Hard Disc Drive), which is a non-volatile storage medium, and a RAM (Random Access Memory), which is a volatile storage medium. The confidential document job controller performs printing by: adding one of security levels (high), (intermediate), (low) to the attribute of a job; and sending the job to a queue for performing a job process appropriately by judging the attribute.

SUMMARY

The confidential document job controller described in Japanese Patent Application Publication No. 2009-140409, however, makes the user feel inconvenient in his/her manipulation, because the user needs to select one of the security levels (high), (intermediate), (low) as the attribute of the job when he/she sends the job.

An object of the present invention is to provide an image forming device and an image forming system capable of erasing a job appropriately depending on the security level without the user having to set the security level (confidentiality).

An image forming device in accordance with some embodiments includes a non-volatile print job storage unit configured to store a print job received from an outside of the image forming device, a non-volatile mapping table storage unit configured to store a mapping table associating a watermark with an overwrite erase pattern predetermined depending on confidentiality indicated by the watermark, a judgment unit configured to judge whether or not the watermark is included in the print job, an extractor configured to extract the overwrite erase pattern corresponding to the watermark included in the print job from the mapping table upon judgment by the judgment unit that the watermark is included, and an erase unit configured to perform an overwrite erase process on the print job stored in the print job storage unit on the basis of the overwrite erase pattern extracted by the extractor.

With the foregoing constitution, if it is judged that the watermark is included, the overwrite erase pattern corresponding to the watermark is extracted from the mapping table and the overwrite erase process is performed on the print job stored in the print job storage unit on the basis of the extracted overwrite erase pattern. For this reason, the job can be erased appropriately depending on the security level without the user having to specifically set the security level (confidentiality).

An image forming system in accordance with some embodiments includes a terminal configured to generate a print job, and an image forming device connected to the terminal. The terminal includes an image data storage unit configured to store image data, a watermark judgment unit configured to judge whether or not a watermark is assigned upon request of printing the image data stored in the image data storage unit, a print job generator configured to generate a print job by adding print setting information, including the watermark, to the image data upon judgment by the watermark judgment unit that the watermark is assigned, and a transmitter configured to transmit the print job generated by the print job generator to the image forming device. The image forming device includes a non-volatile print job storage unit configured to store the print job received from the terminal, a non-volatile mapping table storage unit configured to store a mapping table associating the watermark with an overwrite erase pattern predetermined depending on confidentiality indicated by the watermark, a judgment unit configured to judge whether or not the watermark is included in the print job, an extractor configured to extract the overwrite erase pattern corresponding to the watermark included in the print job from the mapping table upon judgment by the judgment unit that the watermark is included, and an erase unit configured to perform an overwrite erase process on the print job stored in the print job storage unit on the basis of the overwrite erase pattern extracted by the extractor.

With the foregoing constitution, the terminal connected to the image forming device judges whether or not the watermark is assigned when the image data stored in the image data storage unit is printed. If it is judged that the watermark is assigned, the terminal generates the print job by adding the print setting information, including the watermark, to the image data, and transmits the generated print job to the image forming device. For this reason, the image forming device can perform the overwrite erase process on the job appropriately depending on the security level of the watermark, which is embedded by the user's manipulation, without the user having to specifically set the security level (confidentiality).

DETAILED DESCRIPTION

Figure 1:
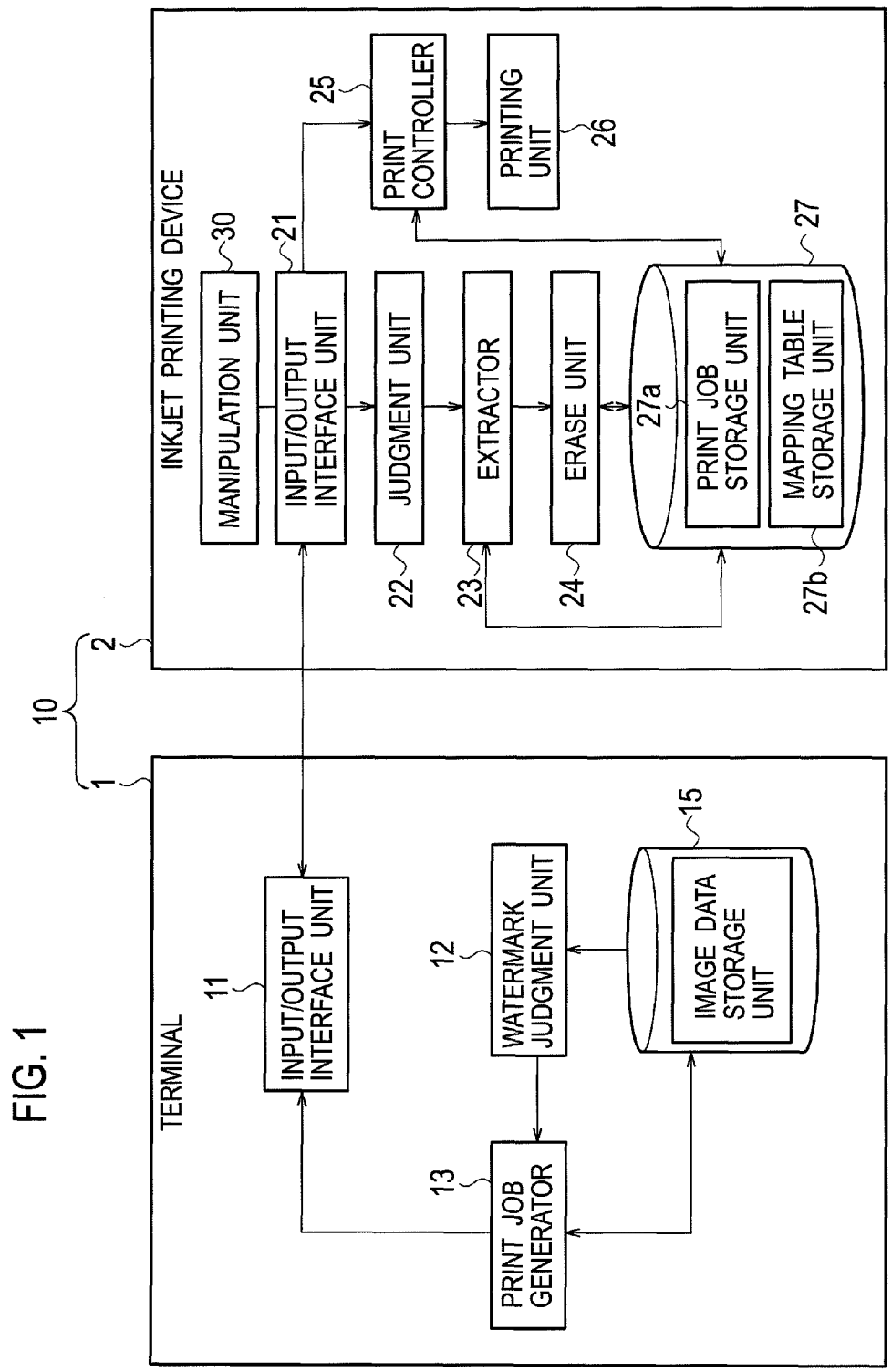
FIG. 1 is a block diagram of an image forming system of an embodiment of the present invention.

In the following detailed description, for purposes of explanation, numerous specific details are set forth in order to provide a thorough understanding of the disclosed embodiments. It will be apparent, however, that one or more embodiments may be practiced without, these specific details. In other instances, well-known structures and devices are schematically shown in order to simplify the drawing.

Descriptions will be hereinbelow provided in detail for an embodiment of the present invention by referring to the drawings.

The embodiment of the present invention will be described by giving an example of an image forming device: connected to a terminal configured to transmit a print job including print setting information; configured to perform printing on the basis of the print job; and configured to erase the print job on the basis of the print setting information and in accordance with the security level.

<Constitution of Image Forming System>

FIG. 1 is a block diagram showing the constitution of an image forming system of the embodiment of the present invention.

As shown in FIG. 1, an image forming system 10 includes: a terminal 1; and an inkjet printing device 2 which is an image forming device configured to read an image and perform printing.

The inkjet printing device 2 includes an input/output interface unit 21, a judgment unit 22, an extractor 23, an erase unit 24, a print controller 25, a printing unit 26, a storage unit 27 and a manipulation unit 30.

The input/output interface unit 21 is a connection interface configured to be connected to the terminal 1. The input/output interface unit 21 receives a print job from the terminal 1, and transmits information about the status of the inkjet printing device 2 to the terminal 1.

The judgment unit 22 judges whether or not a watermark is included in print setting information about the print job transmitted from the terminal 1.

If the judgment unit 22 judges that the watermark is included there, the extractor 23 extracts an overwrite erase pattern corresponding to the watermark included in the print setting information on the basis of a mapping table.

The erase unit 24 erases the print job stored in a print job storage unit 27a, which will be described later, on the basis of the overwrite erase pattern extracted by the extractor 23.

The print controller 25 causes the printing unit 26 to perform printing on the basis of: the print job generated on the basis of the user's manipulation; or the print job supplied from the terminal 1.

The printing unit 26 performs color printing on a print medium such as a long sheet of roll paper or a print medium cut in predetermined dimensions by ejecting a total of four color inks, namely cyan (C), magenta (M), yellow (Y) and black (B) inks, from the respective inkjet heads (not illustrated) on the basis of the print job supplied from the print controller 25.

The storage unit 27 is a non-volatile storage medium like a hard disc or the like. Various control programs and the like to be executed by the print controller 25 are stored in the storage unit 27. The storage unit 27 includes the print job storage unit 27a and a mapping table storage unit 27b as storage areas.

The print job transmitted from the terminal 1 is stored in the print job storage unit 27a.

As the mapping table, the watermark and the overwrite erase pattern, which is a pattern of data to be overwritten on the print job storage unit 27a, are stored in the mapping table storage unit 27b while associated with each other.

Figures 2, 3:
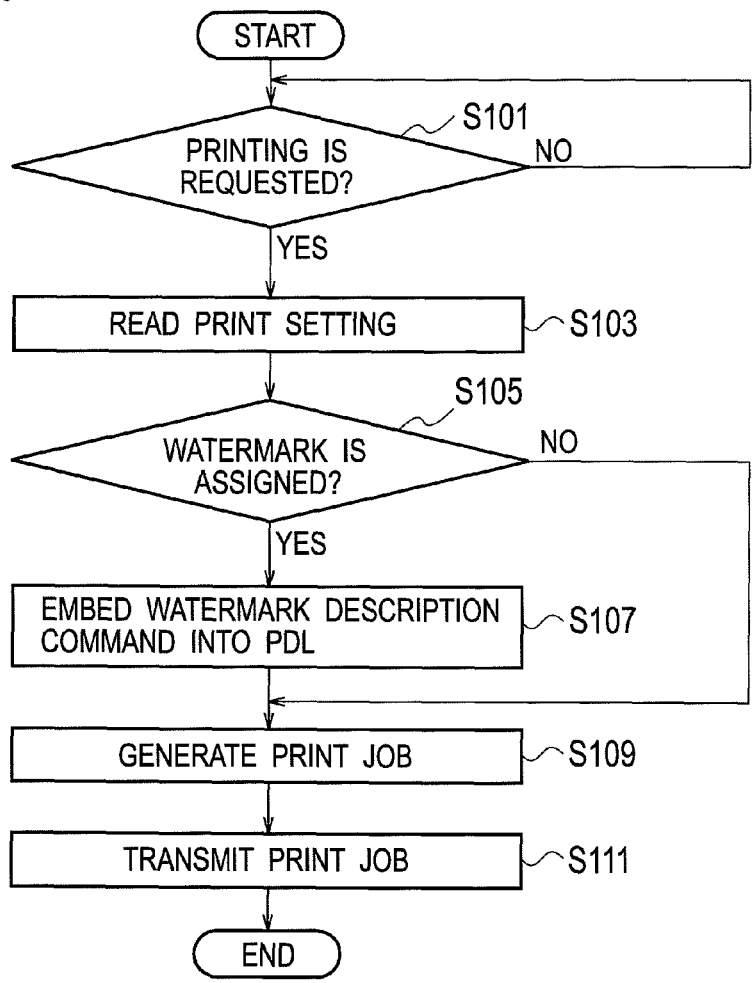
FIG. 2 is an explanatory diagram showing an example of a mapping table which is stored in a mapping table storage unit included in the image forming system of the embodiment of the present invention.
FIG. 3 is a flowchart showing a procedure in which a print job transmitting process is performed by a terminal of the image forming system of the embodiment of the present invention.

FIG. 2 is an explanatory diagram showing an example of the mapping table which is stored in the mapping table storage unit 27b.

As shown in FIG. 2, as the mapping table, a column name "watermark" (reference sign 101) and a column name "overwrite erase pattern" (reference sign 102) are stored there while associated with each other.

In this respect, the overwrite erase pattern 102 is beforehand set in a way that increases the number of times the overwrite erase is performed as the security level becomes higher. For example, the overwrite erase pattern 102 corresponding to a watermark 101 whose security level is higher, such as "CLASSIFIED" or "HIGHLY CLASSIFIED," is set as "00x0=>0xFF=>random numbers." This means that the overwrite erase pattern 102 is set in a way that enables the erase to be achieved with high accuracy by performing the overwrite erase three times, for example, by performing the first overwrite erase with "00x0," the second overwrite erase with "00xFF" and the third overwrite erase with "random numbers."

On the other hand, if the watermark 101 is "NOT ASSIGNED," that is to say, if the security level is lowest, the erase need not be performed. For this reason, the overwrite erase pattern 102 is set as "NOT PERFORMED."

The manipulation unit 30 includes various manipulation keys like: a display/input panel (not illustrated); start keys (not illustrated) for starting the reading operation by a reader (not illustrated), the printing operation and the like; stop keys (not illustrated) for terminating the reading operation, the printing operation and the like; and figure keys (not illustrated) for inputting the number of copies to be printed and the like. Operation signals based on the user's manipulation are supplied to the input/output interface unit 21 from the manipulation unit 30.

The display/input panel of the manipulation unit 30 includes: a pressure-sensitive or electrostatic-type transparent touch panel (not illustrated) placed in the front; and a liquid crystal panel (not illustrated) placed on the back of this touch panel, and configured to display various display screens. The user can press and manipulate the various buttons by directly touching the front surface of the touch panel with his/her finger(s) or the like while looking at the display screens on the liquid display panel.

The terminal 1 includes an input/output interface unit 11, a watermark judgment unit 12, a print job generator 13 and an image data storage unit 15.

The input/output interface unit 11 is a connection interface configured to be connected to the inkjet printing device 2. The input/output interface unit 11 sends the print job, which is generated by the print job generator 13 and is to be printed by the inkjet printing device 2, to the inkjet printing device 2.

The watermark judgment unit 12 judges whether or not the watermark is assigned, in a case where image data stored in the image data storage unit 15 is requested to be printed.

If the watermark judgment unit 12 judges that the watermark is assigned, the print job generator 13 generates the print job by adding the print setting information, including the watermark, to the image data.

The image data storage unit 15 is made from a non-volatile storage medium, and stores the image data <Operation of Terminal 1>

Descriptions will be provided for how the terminal 1 of the image forming system 10 of the embodiment of the present invention works.

The terminal 1 of the image forming system 10 of the embodiment of the present invention mainly performs a print job transmitting process, while the inkjet printing device 2 connected to the terminal 1 performs a print overwrite process. Detailed descriptions will be hereinbelow provided for each process.

<<Print Job Transmitting Process>>

FIG. 3 is a flowchart showing a procedure in which the print job transmitting process is performed by the terminal 1 of the image forming system 10 of the embodiment of the present invention.

As shown in FIG. 3, the print job generator 13 judges whether or not the printing is requested to be started (in step S101). For example, in a case where the user manipulates the setting screen of a printer driver to embed the watermark and request the printing, the print job generator 13 judges that the printing is requested to be started.

If it is judged that the printing is requested to be started (if YES) in step S101, the watermark judgment unit 12 reads the contents of the print setting given by the user's manipulation (in step S103).

Subsequently, on the basis of the print setting thus read, the watermark judgment 12 judges whether or not the watermark is assigned (in step 105). To put it specifically, in a case where the user manipulates the setting screen of the printer driver to input or select the watermark and embed the watermark, the water mark judgment 12 judges that the watermark is assigned on the basis of the read print setting.

If it is judged that the water mark is assigned (if YES) in step S105, the print job generator 13 embeds a watermark description command into the PDL (Page Description Language) (in step S107). To put it specifically, the print job generator 13 embeds a flag for indicating that at least the watermark is embedded and a character string of the watermark inputted or selected, as the print setting information, into the PDL.

Subsequently, the print job generator 13 generates the print job (in step S109). To put it specifically, in step S109, the print job generator 13 generates the print job by embedding the image data stored in the image data storage unit 15 into the PDL into which the print setting information is embedded.

Thereafter, the print job generator 13 transmits the print job (in step S111). To put it specifically, the input/output interface unit 11 transmits the print job generated by the print job generator 13 to the inkjet printing device 2.

<Print Overwrite Process>

Figure 4:
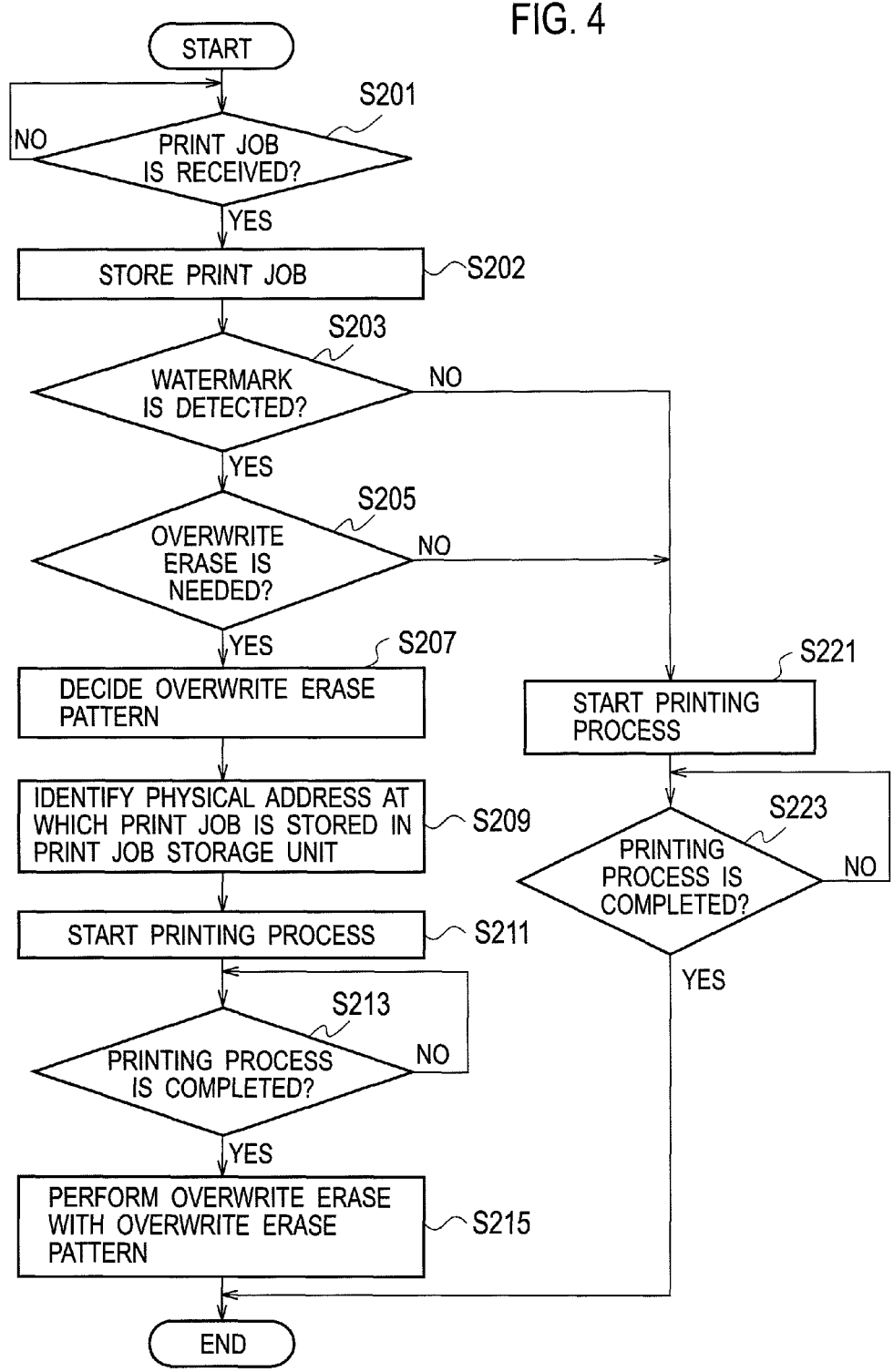
FIG. 4 is a flowchart showing a procedure in which a print overwrite process is performed by an inkjet printing device of the image forming system of the embodiment of the present invention.

FIG. 4 is a flowchart showing a procedure in which the print overwrite process is performed by the inkjet printing device 102 of the image forming system 10 of the embodiment of the present invention.

As shown in FIG. 4, the judgment unit 22 of the inkjet printing device 2 judges whether or not the print job is transmitted from the terminal 1, that is to say, whether or not the print job is received (in step S201).

If it is judged that the print job is received (if YES) in step S201, the print controller 25 causes the received print job to be stored in the print job storage unit 27a of the storage unit 27 (in step S202).

Subsequently, the judgment unit 22 judges whether or not the watermark is included in the print setting information about the print job (in step S203). For example, the judgment unit 22 judges whether or not the watermark description command is included in the print job transmitted from the terminal 1.

If it is judged that the watermark is included in the print setting information about the print job (if YES) in step S203, the extractor 23 judges whether or not the overwrite erase is needed (in step 205). To put it specifically, the extractor 23 judges that the overwrite erase is needed, if the flag for indicating that the watermark is embedded in the watermark description command is ON.

If it is judged that the watermark is not included in the print setting information about the print job (if NO) in step S203, and if it is judged that the overwrite erase is not needed (if NO) in step S205, the print controller 25 starts the printing process on the basis of the print job stored in the print job storage unit 27a (in step S221). To put it specifically, on the basis of the print job supplied from the print controller 25, the printing unit 26 performs the color printing on the print medium cut in the predetermined dimensions by ejecting the total of four inks, namely the cyan (C), magenta (M), yellow (Y) and black (B) inks, from the respective inkjet heads.

Subsequently, the print controller 25 judges whether or not the printing process is completed (in step S223). To put it specifically, the print controller 25 judges that the printing process is completed, if all the printing process based on the print job stored in step S202 is completed.

On the other hand, if it is judged that the overwrite erase is needed (if YES) in step S205, the extractor 23 decides the overwrite erase pattern (in step S207). To put it specifically, the extractor 23 extracts the watermark from the print setting information, and decides the overwrite erase pattern corresponding to this extracted watermark from the mapping table stored in the mapping table storage unit 27b. For example, in a case where the extracted watermark is "company secret," the extractor 23 decides "0x00" as the overwrite erase pattern because the overwrite erase pattern corresponding to this "company secret" is set as "0x00" (see FIG. 2).

Subsequently, the erase unit 24 identifies a physical address at which the print job is stored in the print job storage unit 27a (in step S209). To put it specifically, on the basis of information about the inode and file system, the erase unit 24 calculates the physical address of a sector in which the target print job is stored. In this respect, the inode means management information about the file size, alteration of time and the like on the print job storage unit 27a in which the print job is stored.

Thereafter, the print controller 25 starts the printing process on the basis of the print job stored in the print job storage unit 27a (in step S211).

Afterward, the print controller 25 judges whether or not the printing process is completed (in step S213).

If it is judged that the printing process is completed (if YES) in step 213, the erase unit 24 performs the overwrite erase with the overwrite erase pattern (in step S215). To put it specifically, the erase unit 24 performs overwrite on the physical address in the print job storage unit 27a which is calculated in step S209 by use of the overwrite erase pattern which is decided by the extractor 23 in step S207. Thereby, the overwrite erase can be performed on the print job stored in step S202.

In the image forming system 10 of the embodiment of the present invention, as described above, the terminal 1 generates the print job by adding the print setting information, including the watermark, to the image data, and transmits the print job to the inkjet printing device 2; if the watermark is included in the print job, the inkjet printing device 2 extracts the overwrite erase pattern corresponding to the watermark included in the print setting information on the basis of the mapping table, and erases the print job stored in the print job storage unit 27a on the basis of this extracted overwrite erase pattern. This makes it possible to erase the job appropriately depending on the confidentiality without the user having to set the security level (confidentiality).

In the image forming system 10 of the embodiment of the present invention, the inkjet printing device 2 performs the overwrite erase on the print job stored in the print job storage unit 27a with the overwrite erase pattern right after it is judged that the printing process is completed. However, the present invention is not limited to this.

For example, if it is judged that the printing process is completed, the inkjet printing device 2 may be configured to perform the overwrite erase on the print job stored in the print job storage unit 27a with the overwrite erase pattern when the inkjet printing device 2 has room for load. For example, the inkjet printing device 2 may be configured to perform the overwrite erase on the print job stored in the print job storage unit 27a with the overwrite erase pattern in a case where any one of the following conditions is satisfied: a condition that no user verification is currently being processed; a condition that no print job is currently on standby; the printing status is currently on standby; and the like.

The mapping table stored in the mapping table storage unit 27b can be changed by the user's manipulation of the manipulation unit 30 included in the inkjet printing device 2. Otherwise, the mapping table may be configured to be changed: by installing a Web server, although not illustrated, in the inkjet printing device 2; and by the user's manipulation of the manipulation unit 30 from the terminal 1 via the Web server.

Furthermore, the image forming system 10 of the embodiment of the present invention is configured: to judge whether or not the watermark expected to be embedded by the user's manipulation for the embedment is included in the print setting information about the print job; and to extract the overwrite erase pattern corresponding to the watermark included in the print setting information on the basis of the mapping table if the watermark is included therein. However, the present invention is not limited to this.

For example, the present invention may be configured: to judge whether or not the watermark is included in the image of an original which is read by a scanner by using a well-known image processing technology; and to perform the same process as described above if the watermark is included therein.

To put it specifically, the inkjet printing device 2 is connected to the scanner configured to read image data from the original which is placed on the contact glass, and receives the image data read by this scanner as the print job. Thereafter, the inkjet printing device 2 recognizes characters by performing a character recognition process on the received image data, and thus judges whether or not the watermark is included in the character string whose characters are recognized. Otherwise, the inkjet printing device 2 judges whether or not an image similar to a predetermined image beforehand stored in the storage unit 27 is included in the received image data. If the inkjet printing device 2 judges that the watermark is included therein, the inkjet printing device 2 extracts the overwrite erase pattern corresponding to the watermark included in the image setting information on the basis of the mapping table.

Thereby, if the watermark is included in the image data read by the scanner, the inkjet printing device 2 is capable of erasing the job appropriately depending on the confidentiality without the user's manipulation for embedding the watermark.

Moreover, in the image forming system 10 of the embodiment of the present invention, the watermark and the overwrite erase pattern are associated with each other, and are thus stored as the mapping table in the mapping table storage unit 27b of the inkjet printing device 2. However, the present invention is not limited to this.

For example, the mapping table may be stored in the storage unit provided to the terminal 1, instead of in the storage unit provided to the inkjet printing device 2. Thereby, the terminal 1 may be configured in a way that: the watermark judgment unit 12 of the terminal 1 judges whether or not the watermark is included in the print job; if the watermark judgment unit 12 judges that the watermark is included in the print job, the print job generator 13 extracts the overwrite erase pattern corresponding to the watermark included in the print setting information on the basis of the mapping table; and subsequently, the print job generator 13 adds this extracted overwrite erase pattern to the print job, and transmits the overwrite erase pattern together with the extracted overwrite erase pattern to the inkjet printing device 2.

In addition, the inkjet printing device 2 of the embodiment of the present invention has been described by giving an example of the inkjet printer configured to perform the color printing on the print medium cut in the predetermined dimensions by ejecting the four color inks from the respective inkjet heads. However, the present invention is not limited to this. The printing device may be any one of the laser, stencil, etc., printing device.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An image forming device comprising:
a non-volatile print job storage unit configured to store a print job received from an outside of the image forming device;
a non-volatile mapping table storage unit having a mapping table stored thereon associating a watermark with an overwrite erase pattern predetermined depending on a level of confidentiality indicated by the watermark;
a judgment unit configured to judge whether or not the watermark is included in the print job;
an extractor configured to decide the overwrite erase pattern corresponding to the watermark included in the print job from the mapping table upon judgment by the judgment unit that the watermark is included; and
an erase unit configured to perform an overwrite erase process on the print job stored in the print job storage unit based on the overwrite erase pattern decided by the extractor.

2. An image forming system comprising:
a terminal configured to generate a print job; and
an image forming device connected to the terminal,
wherein the terminal comprises:
an image data storage unit configured to store image data;
a watermark judgment unit configured to judge whether or not a watermark is assigned upon request of printing the image data stored in the image data storage unit;
a print job generator configured to generate a print job by adding print setting information, including the watermark, to the image data upon judgment by the watermark judgment unit that the watermark is assigned; and a transmitter configured to transmit the print job generated by the print job generator to the image forming device, and wherein the image forming device comprises:

a non-volatile print job storage unit configured to store the print job received from the terminal;

a non-volatile mapping table storage unit having a mapping table stored thereon associating the watermark with an overwrite erase pattern predetermined depending on a level of confidentiality indicated by the watermark;

a judgment unit configured to judge whether or not the watermark is included in the print job;

an extractor configured to decide the overwrite erase pattern corresponding to the watermark included in the print job from the mapping table upon judgment by the judgment unit that the watermark is included; and an erase unit configured to perform an overwrite erase process on the print job stored in the print job storage unit based on the overwrite erase pattern decided by the extractor.

* * * * *